United States Patent [19]
Imaizumi et al.

[11] Patent Number: 4,653,870
[45] Date of Patent: Mar. 31, 1987

[54] COMPACT VARI-FOCAL PHOTOGRAPHIC LENS SYSTEM

[75] Inventors: Masaki Imaizumi, Nagano; Hiroshi Takase; Toru Fujii, both of Tokyo, all of Japan

[73] Assignee: Olympus Optical Co., Ltd., Tokyo, Japan

[21] Appl. No.: 707,867

[22] Filed: Mar. 4, 1985

[30] Foreign Application Priority Data

Mar. 7, 1984 [JP] Japan .................................. 59-41975

[51] Int. Cl.⁴ ............................................. G02B 15/02
[52] U.S. Cl. .................................................... 350/422
[58] Field of Search ......................................... 350/422

[56] References Cited
FOREIGN PATENT DOCUMENTS

56-128911 10/1981 Japan .
57-46224 3/1982 Japan .
58-108510 6/1983 Japan .

Primary Examiner—John K. Corbin
Assistant Examiner—Rebecca D. Gass
Attorney, Agent, or Firm—Cushman, Darby & Cushman

[57] ABSTRACT

A compact vari-focal photographic lens system comprising a master lens system and an auxiliary lens group wherein the master lens system comprises a front lens unit having positive refractive power and a rear lens unit having negative refractive power, the compact vari-focal photographic lens system being arranged to vary the focal length of the lens system as a whole by inserting and removing the auxiliary lens group to and from the image side of the master lens system and arranged that the overall length of the lens system is short, it is possible to vary the focal length without moving the stop mechanism, and aberrations are corrected satisfactorily favorably, the compact vari-focal photographic lens system being suitable for the use with popular cameras.

5 Claims, 9 Drawing Figures

FIG. 1

COMPACT VARI-FOCAL PHOTOGRAPHIC LENS SYSTEM

BACKGROUND OF THE INVENTION (a) Field of the Invention

The present invention relates to a compact vari-focal photographic lens system and, more particularly, to a compact vari-focal photographic lens system comprising a detachably attached auxiliary lens group which is to be used with popular cameras of which the lenses are not interchangeable and which need to be convenient for carrying.

(b) Description of the Prior Art

Recently, there is an increasing demand for popular cameras of which the lenses are not interchangeable, which are small in size and light in weight and which enable to take photographs easily and readily. Besides, as additional functions for popular cameras, various mechanisms are provided such as an automatic focusing mechanism, automatic film winding mechanism, date inserting mechanism (a mechanism for photographing the date together with the object), etc., and the utility value of popular cameras of which the lenses are not interchangeable is becoming still higher. However, as the popular cameras of which the lenses are not interchangeable need to be small in size, the lens systems which are to be used with this type of cameras and which are commercially available are mostly arranged as the fixed focal length type lens systems of which the focal length cannot be varied, and there exists almost no vari-focal lens system.

On the other hand, the rear converter type, inner converter type, etc. are known as the types of vari-focal lens systems.

Of said types, the rear converter type vari-focal lens systems are known, for example, as disclosed in Japanese published unexamined patent application No. 46224/82. However, in case of the rear converter type lens systems, the distance from the master lens to the image surface varies when the converter lens is inserted and, therefore, this type of lens systems are not suitable for such cameras as the popular cameras which are so constructed that it is difficult to move the stop and shutter.

The inner converter type vari-focal lens systems are known, for example, as disclosed in Japanese published unexamined patent application No. 108510/83. In case of the inner converter type lens systems, the converter lens is to be inserted in a narrow space in an intermediate portion of the lens system and, consequently, it is necessary to move a part of the master lens before inserting the converter lens. Moreover, to insert the converter lens to the intermediate portion of the lens system, a hole for inserting the converter lens should be provided at an intermediate portion of the lens mount and, consequently, the strength of the lens mount becomes insufficient.

Besides, the zoom type vari-focal lens systems are also known, for example, as disclosed in Japanese published unexamined patent application No. 128911/81. However, the zoom type vari-focal lens system are not suitable for the use with the popular cameras of which the lenses are not interchangeable.

SUMMARY OF THE INVENTION

It is, therefore, a primary object of the present invention to provide a compact vari-focal photographic lens system with a short overall length and excellent portability which is arranged to be capable of varying the focal length without moving the stop mechanism, said compact vari-focal photographic lens system being thereby arranged to be simple in the mechanism and, at the same time, arranged that aberrations thereof are corrected satisfactorily favourably, said compact vari-focal photographic lens system being suitable for the use with the popular cameras of which the lenses are not interchangeable.

The compact vari-focal photographic lens system according to the present invention comprises a master lens system and an detachably attached auxiliary lens group wherein the master lens system comprises a front lens unit having positive refractive power and a rear lens unit having negative refractive power, said compact vari-focal photographic lens system being arranged to vary the focal length of the lens system as a whole by attaching and detaching the auxiliary lens group on the image side of said rear lens group which constitutes the master lens system and, at the same time, by moving said front lens group.

When a lens system is arranged that the front lens unit has positive refractive power and the rear lens unit has negative refractive power, i.e., when the lens system as a whole is arranged as a telephoto type lens system, it is possible to obtain a compact lens system which is one of objects of the present invention. In other words, by arranging the lens system as a telephoto type lens system as described in the above, it is possible to shift the image principal point of the lens system toward the object side and, therefore, it is possible to make the overall length of the lens system short.

Due to the above-mentioned reason, the compact vari-focal photographic lens system according to the present invention is arranged that the master lens system comprises a front lens unit having positive refractive power and a rear lens unit having negative refractive power as described before. When the master lens system has the above-mentioned lens composition and an auxiliary lens group is inserted on the image side of the rear lens unit, which constitutes the master lens system, in order to vary the focal length, the image position in respect to the master lens system varies. To keep the image position unchanged by correcting the above-mentioned variation of the image position, it is necessary to integrally move the master lens system as a whole. In that case, the stop mechanism should be moved together with the master lens system and, consequently, the stop mechanism becomes complicated.

The compact vari-focal photographic lens system according to the present invention is characterized in that said lens system is arranged to move the front lens unit, at the same time as the auxiliary lens group is inserted, so that the focal length of the lens system as a whole is varied by keeping the image position unchanged and without moving the stop mechanism and rear lens unit.

Besides, when it is attempted to compose a lens system having a wide field angle by means of the aforementioned telephoto type lens system, it becomes difficult to correct offaxial aberrations. That is, the rays refracted by the front lens unit, which has positive refractive power, enter the rear lens unit having negative refractive power after passing through the stop. As a result, there occurs a strong tendency that distortion varies toward the positive direction and, moreover, astigmatism also becomes large.

Therefore, in the case of the master lens system of the compact vari-focal photographic lens system according to the present invention, the front lens unit is arranged to comprise a positive meniscus lens, a biconcave lens with strong power, and a biconvex lens so that the above-mentioned positive refractive power is offset by means of the biconcave lens with strong power and aberrations to be caused become small and, moreover, the rear lens unit is arranged to comprise a meniscus lens, which is convex toward the image said and has a shape concentric with the stop, so that astigmatism to be caused becomes small. By arranging as described in the above, it is possible to obtain a lens system of which the field angle $2\omega$ is about 48° and aberrations are corrected satisfactorily favourably.

To make the field angle still wider by using the lens system as described in the above as the master lens system, the auxiliary lens group having positive refractive power is attached on the image side of the rear lens unit which constitutes the master lens group. Thus, the refractive power of the lens system as a whole becomes stronger and the field angle becomes wider. At that time, the image position shifts toward the master lens system. Therefore, in case of the compact vari-focal photographic lens system according to the present invention, the front lens unit is moved toward the image side in order to correct so that the image position is kept unchanged. That is, by moving the front lens unit toward the image side at the same time as attaching the auxiliary lens group, it is possible to make the field angle of the lens system as a whole wider without moving the stop mechanism and rear lens unit.

Moreover, as the auxiliary lens group having positive refractive power is attached on the image side of the rear lens unit, i.e., as the auxiliary lens group having positive refractive power is inserted at a position where the heights of offaxial rays are large, the correcting function by the auxiliary lens group works effectively, and it is possible to cancel the tendency that distortion varies toward the positive direction and tendency that astigmatism increases which are weak points of telephoto type lens systems. Besides, as the front lens unit approaches the stop, the entrance pupil of the lens system approaches the front lens unit, and it is possible to make offaxial aberrations to be caused by the front lens unit small.

By arranging that the auxiliary lens group comprises a positive lens and a negative lens, it is possible to maintain Petzval's sum at an adequate value and it is also possible to make chromatic aberration to be caused small.

DETAILED DESCRIPTION OF THE PREFERRED EMBODIMENTS

Now, preferred embodiments of the compact vari-focal photographic lens system according to the present invention are shown below.

EMBODIMENT 1

Embodiment 1

(state with the auxiliary lens group)
$f = 100$, F/4.1, $2\omega = 57.55°$, $f_B = 33.904$ $r_1 = 37.4069$
$d_1 = 9.1537$    $n_1 = 1.77250$    $\nu_1 = 49.66$
$r_2 = 77.8635$
$d_2 = 4.8311$
$r_3 = -139.4859$
$d_3 = 2.5427$    $n_2 = 1.78472$    $\nu_2 = 25.71$
$r_4 = 63.3084$
$d_4 = 7.2920$
$r_5 = 71.2355$
$d_5 = 10.0027$   $n_3 = 1.80618$    $\nu_3 = 40.95$
$r_6 = -123.5363$
$d_6 = 3.006$
$r_7 = \infty$ (stop)
$d_7 = 19.8094$
$r_8 = -22.656$
$d_8 = 2.5427$    $n_4 = 1.50137$    $\nu_4 = 56.40$
$r_9 = -34.1279$
$d_9 = 3.3991$
$r_{10} = -689.4165$
$d_{10} = 5.6604$ $n_5 = 1.77250$    $\nu_5 = 49.66$
$r_{11} = -52.1041$
$d_{11} = 7.2850$
$r_{12} = -56.2962$
$d_{12} = 8.6048$ $n_6 = 1.64769$    $\nu_6 = 33.80$
$r_{13} = -36114.2955$ (state without the auxiliary lens group)
$f = 122.688$, F/4.67, $2\omega = 48.23$ $f_B = 58.857$
$r_1 = 37.4069$
$d_1 = 9.1537$    $n_1 = 1.77250$    $\nu_1 = 49.66$
$r_2 = 77.8635$
$d_2 = 4.8311$
$r_3 = -139.4859$
$d_3 = 2.5427$    $n_2 = 1.78472$    $\nu_2 = 25.71$
$r_4 = 63.3084$
$d_4 = 7.2920$
$r_5 = 71.2355$
$d_5 = 10.0027$   $n_3 = 1.80610$    $\nu_3 = 40.95$
$r_6 = -123.5363$
$d_6 = 8.4222$
$r_7 = \infty$ (stop)
$d_7 = 19.8094$
$r_8 = -22.6560$
$d_8 = 2.5427$    $n_4 = 1.50137$    $\nu_4 = 56.40$
$r_9 = -34.1279$

EMBODIMENT 2

Embodiment 2

(state with the auxiliary lens group)
$f = 100$, F/3.6, $2\omega = 57.55$, $f_B = 30.955$ $r_1 = 37.6419$
$d_1 = 9.1366$    $n_1 = 1.77250$    $\nu_1 = 49.66$
$r_2 = 79.6905$
$d_2 = 4.8055$
$r_3 = -138.0254$
$d_3 = 2.5426$    $n_2 = 1.78472$    $\nu_2 = 25.71$
$r_4 = 62.9575$
$d_4 = 7.2829$
$r_5 = 71.0279$
$d_5 = 9.9741$    $n_3 = 1.80610$    $\nu_3 = 40.95$
$r_6 = -123.2100$
$d_6 = 4.621$
$r_7 = \infty$ (stop)
$d_7 = 19.7470$ -continued Embodiment 2

| | | |
|---|---|---|
| $r_8 = -22.7189$ | | |
| $d_8 = 2.5426$ | $n_4 = 1.50137$ | $\nu_4 = 56.40$ |
| $r_9 = -34.2129$ | | |
| $d_9 = 1.8935$ | | |
| $r_{10} = -8522.6830$ | | |
| $d_{10} = 8.8648$ | $n_5 = 1.75700$ | $\nu_5 = 47.87$ |
| $r_{11} = -58.1729$ | | |
| $d_{11} = 7.3270$ | | |
| $r_{12} = -71.4369$ | | |
| $d_{12} = 10.1704$ | $n_6 = 1.69895$ | $\nu_6 = 30.12$ |
| $r_{13} = 643.5050$ | | |

(state without the auxiliary lens group)
$f = 122.680, F/4.14, 2\omega = 48.23$

| | | |
|---|---|---|
| $f_B = 59.203$ | | |
| $r_1 = 37.6419$ | | |
| $d_1 = 9.1366$ | $n_1 = 1.77250$ | $\nu_1 = 49.66$ |
| $r_2 = 79.6905$ | | |
| $d_2 = 4.8083$ | | |
| $r_3 = -138.0254$ | | |
| $d_3 = 2.5426$ | $n_2 = 1.78472$ | $\nu_2 = 25.71$ |
| $r_4 = 62.9575$ | | |
| $d_4 = 7.2829$ | | |
| $r_5 = 71.0279$ | | |
| $d_5 = 9.9741$ | $n_3 = 1.80610$ | $\nu_3 = 40.95$ |
| $r_6 = -123.2100$ | | |
| $d_6 = 8.340$ | | |
| $r_7 = \infty$ (stop) | | |
| $d_7 = 19.7470$ | | |
| $r_8 = -22.7189$ | | |
| $d_8 = 2.5426$ | $n_4 = 1.50137$ | $\nu_4 = 56.40$ |
| $r_9 = -34.2129$ | | |

In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol $f$ represents the focal length of the lens system as a whole, and reference symbol $f_B$ represents the back focal distance.

Figure 1:
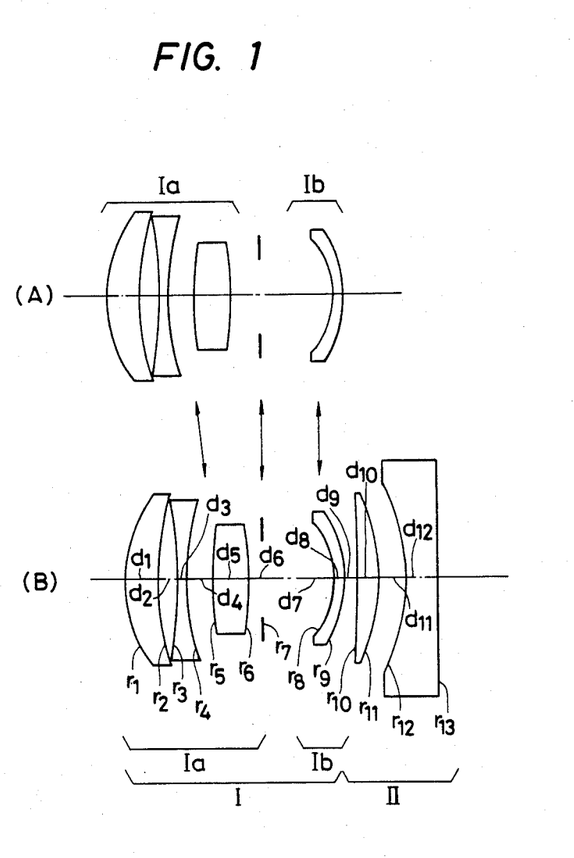
FIG. 1 shows a sectional view of respective embodiments of the compact vari-focal photographic lens system according to the present invention.

Embodiments 1 and 2 shown in the above respectively have the lens configuration as shown in FIG. 1. That is, on the image side of the master lens system I shown in the upper portion (A) of FIG. 1, the auxiliary lens group II is inserted so that the lens system as a whole has the lens configuration as shown in the lower portion (B) of FIG. 1 and has a wide field angle. At the same time as above, the front lens unit Ia constituting the master lens system I is moved toward the image side so that the distance from the master lens system to the image surface will not be varied. That is, the airspace $d_6$ is varied from 8.4222 to 3.006 in case of Embodiment 1 and from 8.340 to 4.621 in case of Embodiment 2 as given in the numerical data shown later.

Said embodiments are arranged to be focused on an object at a short distance by advancing the front lens unit Ia. Each of said embodiments is arranged that aberrations of the front lens unit Ia itself are corrected considerably favourably. Therefore, even when the lens system is focused on an object at a short distance by advancing the front lens unit Ia, there occurs almost no variation of aberrations. Besides, when the above-mentioned focusing method is adopted, it is convenient for providing an automatic focusing mechanism due to reasons that the number of lenses to be moved is small and so forth.

The following numerical data show the values of the airspace $d_6$ of respective embodiments when they are focused by the above-mentioned focusing method.

| object point | $\infty$ | $-\frac{1}{75}$ |
|---|---|---|
| Embodiment 1 | | |
| state without the auxiliary lens group | 3.006 | 3.9786 |
| state with the auxiliary lens group | 8.4222 | 9.214 |
| Embodiment 2 | | |
| state without the auxiliary lens group | 4.621 | 5.593 |
| state with the auxiliary lens group | 8.340 | 9.131 |

Figure 2:
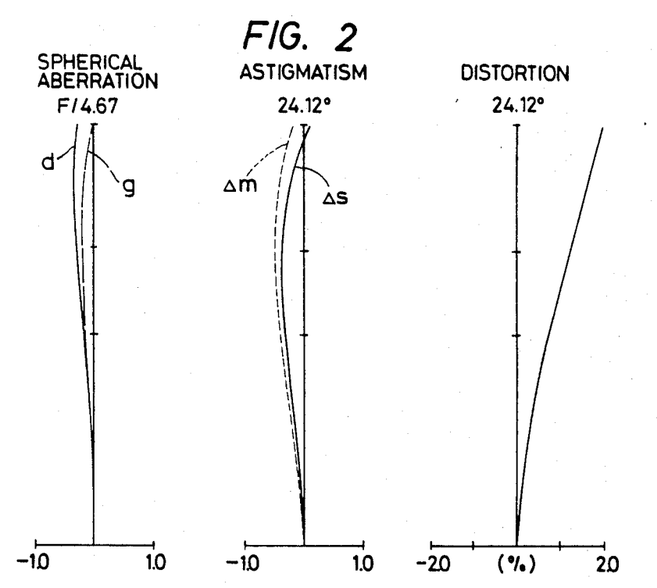
FIGS. 2 through 5 respectively show graphs illustrating aberration curves of Embodiment 1 of the present invention.
Figure 3:
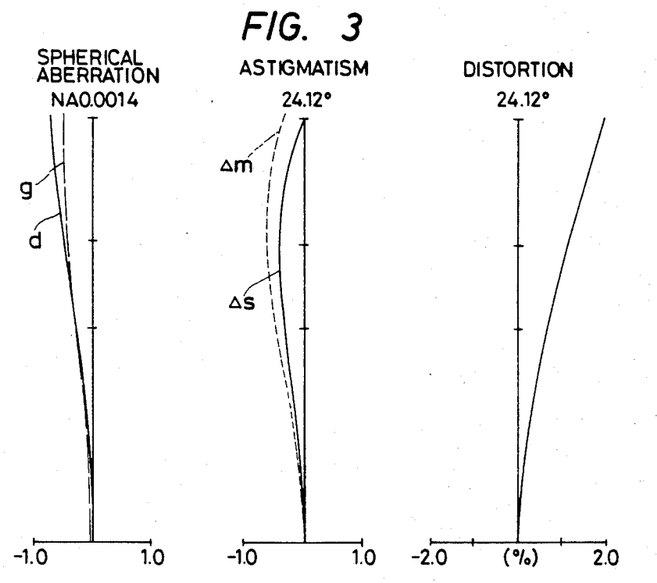
Figure 4:
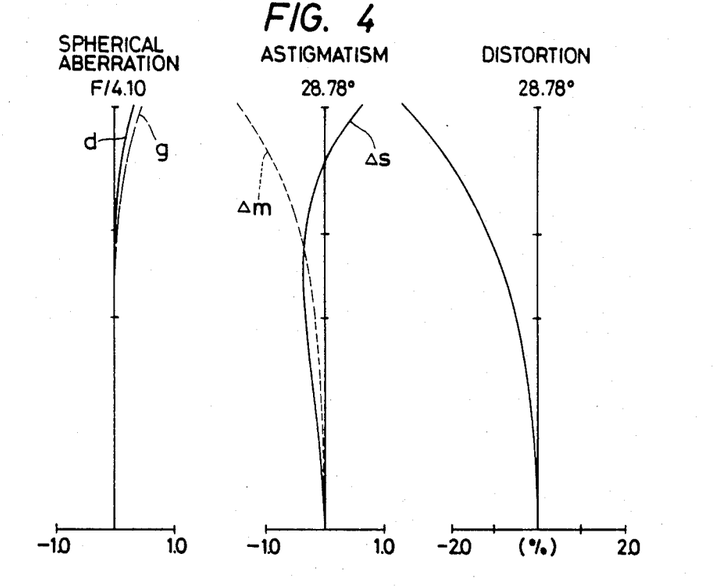
Figure 5:
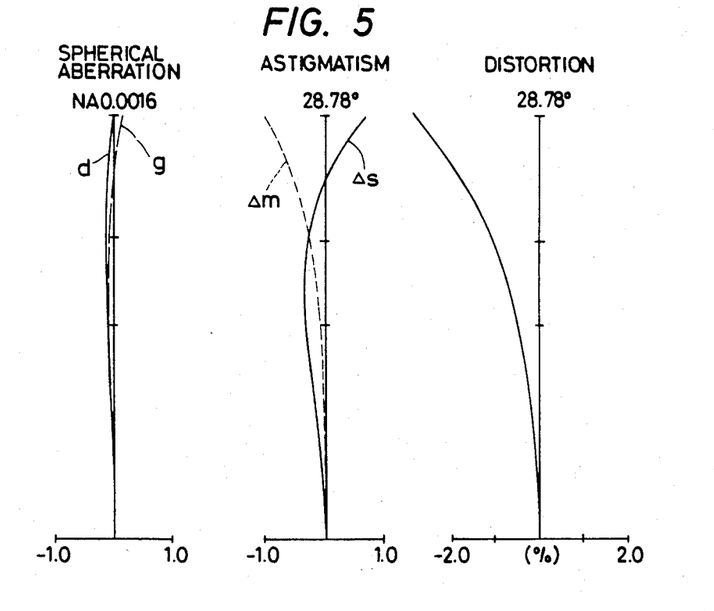
Figure 6:
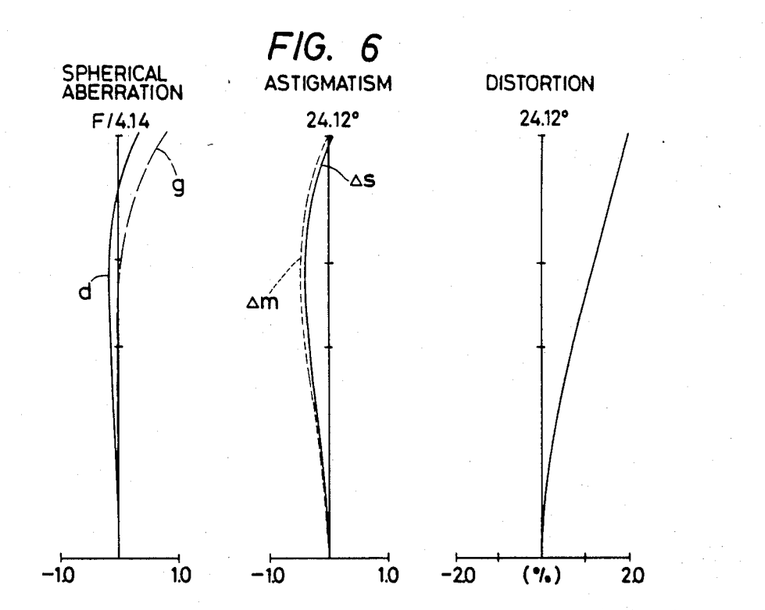
FIGS. 6 through 9 respectively show graphs illustrating aberration curves of Embodiment 2 of the present invention.
Figure 7:
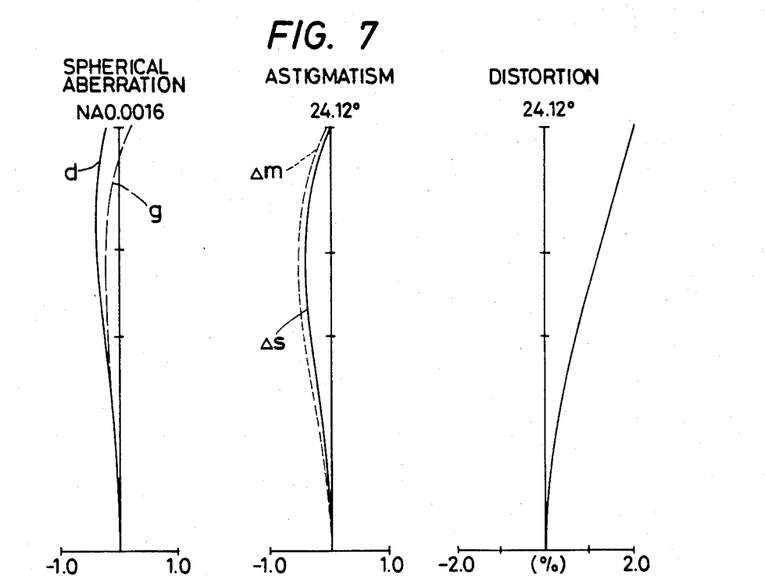
Figure 8:
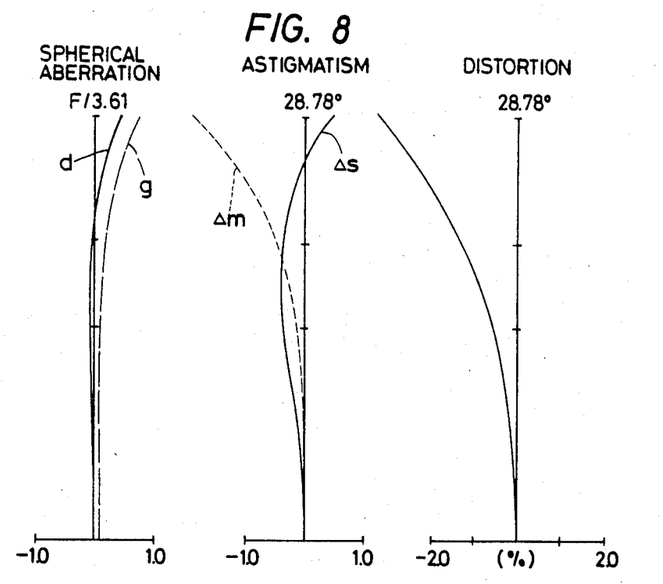
Figure 9:
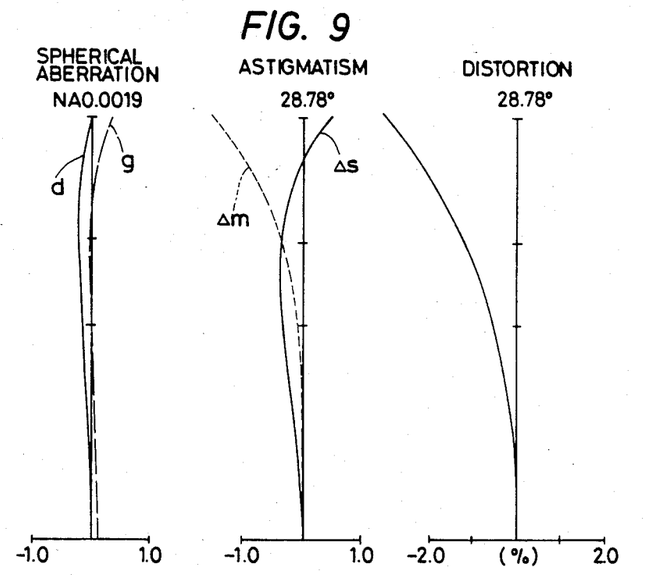

Aberration curves of Embodiment 1 are shown in FIGS. 2 through 5 respectively. Out of them, FIG. 2 shows aberration curves when Embodiment 1 in the state without the auxiliary lens group is focused on an object at the infinite distance, FIG. 3 shows aberration curves when Embodiment 1 in the state without the auxiliary lens group is focused on an object at the magnification of $-1/75$, FIG. 4 shows aberration curves when Embodiment 1 in the state that the auxiliary lens group is inserted is focused on an object at the infinite distance, and FIG. 5 shows aberration curves when Embodiment 1 in the state that the auxiliary lens group is inserted is focused on an object at the magnification of $-1/75$. Aberration curves of Embodiment 2 are shown in FIGS. 6 through 9 respectively. Out of them, FIG. 6 shows aberration curves when Embodiment 2 in the state without the auxiliary lens group is focused on an object at the infinite distance, FIG. 7 shows aberration curves when Embodiment 2 in the state without the auxiliary lens group is focused on an object at the magnification of $-1/75$, FIG. 8 shows aberration cueves when Embodiment 2 in the state that the auxiliary lens group is inserted is focused on an object at the infinite distance, and FIG. 9 shows aberration curves when Embodiment 2 in the state that the auxiliary lens group is inserted is focused on an object at the magnification of $-1/75$.

The compact vari-focal photographic lens system according to the present invention is small in size because a telephoto type lens system is adopted as the master lens system. Besides, as shifting of the image position to be caused when the auxiliary lens group is inserted is corrected by moving the front lens group constituting the master lens system, it is not necessary to move the stop and, consequently, it is possible to simplify the moving mechanism and the like. Therefore, the compact vari-focal photographic lens system according to the present invention is extremely effective when used as a lens system for popular cameras of which the lenses are not interchangeable. Moreover, when a lens group having positive refractive power is used as the auxiliary lens group, it is possible to thereby correct offaxial aberrations of the master lens system and, therefore, it is possible to make the field angle of the master lens system still wider. Besides, when the auxiliary lens group having positive refractive power is arranged to comprise a positive lens and a negative lens, it is possible to correct aberrations more favourably. Furthermore, as illustrated by respective embodiments, it is possible to make the overall length the lens system in the state without the auxiliary lens group approximately same as the focal length of the lens system as a whole and to make the overall length of the lens system in the state with the auxiliary lens group shorter than the focal length of the lens system as a whole.

We claim:

1. A compact vari-focal photo lens system comprising a master lens system and an auxiliary lens group wherein said master lens system comprises a front lens unit having positive refractive power and a rear lens unit having negative refractive power, and said auxiliary lens group is arranged to be inserted to and removed from the image side of said rear lens unit constituting said master lens system, said compact vari-focal photographic lens system being arranged to vary the focal length of said photographic lens system as a whole by inserting and removing said auxiliary lens group and, at the same time, moving said front lens unit.

2. A compact vari-focal photographic lens system according to claim 1 wherein said auxiliary lens group has positive refractive power and said compact vari-focal photographic lens system is arranged to move said front lens unit toward the image side at the same time as inserting said auxiliary lens group.

3. A compact vari-focal photographic lens system according to claim 2 wherein said auxiliary lens group comprises a positive lens and a negative lens.

4. A compact vari-focal photographic lens system according to claim 3 wherein said front lens unit constituting said master lens system comprises a positive meniscus lens, a biconcave lens and a biconvex lens, said rear lens unit constituting said master lens system comprises a negative meniscus lens, said auxiliary lens group comprises a positive lens and a negative lens, and said compact vari-focal photographic lens system has the following numerical data:

(state with the auxiliary lens group)
$f = 100, F/4.1, 2\omega = 57.55°, f_B = 33.904$

| | | |
|---|---|---|
| $r_1 = 37.4069$ | | |
| $d_1 = 9.1537$ | $n_1 = 1.77250$ | $\nu_1 = 49.66$ |
| $r_2 = 77.8635$ | | |
| $d_2 = 4.8311$ | | |
| $r_3 = -139.4859$ | | |
| $d_3 = 2.5427$ | $n_2 = 1.78472$ | $\nu_2 = 25.71$ |
| $r_4 = 63.3084$ | | |
| $d_4 = 7.2920$ | | |
| $r_5 = 71.2355$ | | |
| $d_5 = 10.0027$ | $n_3 = 1.80610$ | $\nu_3 = 40.95$ |
| $r_6 = -123.5363$ | | |
| $d_6 = 3.006$ | | |
| $r_7 = \infty$ (stop) | | |
| $d_7 = 19.8094$ | | |
| $r_8 = -22.666$ | | |
| $d_8 = 2.5427$ | $n_4 = 1.50137$ | $\nu_4 = 56.40$ |
| $r_9 = -34.1279$ | | |
| $d_9 = 3.3391$ | | |
| $r_{10} = -689.4165$ | | |
| $d_{10} = 5.6604$ | $n_5 = 1.77250$ | $\nu_5 = 49.66$ |
| $r_{11} = -52.1041$ | | |
| $d_{11} = 7.2850$ | | |
| $r_{12} = -56.2862$ | | |
| $d_{12} = 8.6048$ | $n_6 = 1.64769$ | $\nu_6 = 33.80$ |
| $r_{13} = -36114.2955$ | | |

(state without the auxiliary lens group)
$f = 122.688, F/4.67, 2\omega = 48.23°$

| | | |
|---|---|---|
| $f_B = 58.857$ | | |
| $r_1 = 37.4069$ | | |
| $d_1 = 9.1537$ | $n_1 = 1.77250$ | $\nu_1 = 49.66$ |
| $r_2 = 77.8635$ | | |
| $d_2 = 4.8311$ | | |
| $r_3 = -139.4859$ | | |
| $d_3 = 2.5427$ | $n_2 = 1.78472$ | $\nu_2 = 25.71$ |
| $r_4 = 63.3084$ | | |
| $d_4 = 7.2920$ | | |
| $r_5 = 71.2355$ | | |
| $d_5 = 10.0027$ | $n_3 = 1.80610$ | $\nu_3 = 40.95$ |

-continued

| | | |
|---|---|---|
| $r_6 = -123.5363$ | | |
| $d_6 = 8.4222$ | | |
| $r_7 = \infty$ (stop) | | |
| $d_7 = 19.8094$ | | |
| $r_8 = -22.6560$ | | |
| $d_8 = 2.5427$ | $n_4 = 1.50137$ | $\nu_4 = 56.40$ |
| $r_9 = -34.1279$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, and reference symbol $f_B$ represents the back focal distance.

5. A compact vari-focal photographic lens system according to claim 3 wherein said front lens unit constituting said master lens system comprises a positive meniscus lens, a biconcave lens and a biconvex lens, said rear lens unit constituting said master lens system comprises a negative meniscus lens, said auxiliary lens group comprises a positive lens and a negative lens, and said compact vari-focal photographic lens system has the following numerical data:

(state with the auxiliary lens group)
$f = 100, F/3.6, 2\omega = 57.55°, f_B = 30.955$

| | | |
|---|---|---|
| $r_1 = 37.6419$ | | |
| $d_1 = 9.1366$ | $n_1 = 1.77250$ | $\nu_1 = 49.66$ |
| $r_2 = 79.6905$ | | |
| $d_2 = 4.8055$ | | |
| $r_3 = -138.0254$ | | |
| $d_3 = 2.5426$ | $n_2 = 1.78472$ | $\nu_2 = 25.71$ |
| $r_4 = 62.9575$ | | |
| $d_4 = 7.2829$ | | |
| $r_5 = 71.0279$ | | |
| $d_5 = 9.9741$ | $n_3 = 1.80610$ | $\nu_3 = 40.95$ |
| $r_6 = -123.2100$ | | |
| $d_6 = 4.621$ | | |
| $r_7 = \infty$ (stop) | | |
| $d_7 = 19.7470$ | | |
| $r_8 = -22.7189$ | | |
| $d_8 = 2.5426$ | $n_4 = 1.50137$ | $\nu_4 = 56.40$ |
| $r_9 = -34.2129$ | | |
| $d_9 = 1.8935$ | | |
| $r_{10} = -8522.6830$ | | |
| $d_{10} = 8.8648$ | $n_5 = 1.75700$ | $\nu_5 = 47.87$ |
| $r_{11} = -58.1729$ | | |
| $d_{11} = 7.3270$ | | |
| $r_{12} = -71.4369$ | | |
| $d_{12} = 10.1704$ | $n_6 = 1.69895$ | $\nu_6 = 30.12$ |
| $r_{13} = 643.5050$ | | |

(state without the auxiliary lens group)
$f = 122.680, F/4.14, 2\omega = 48.23$

| | | |
|---|---|---|
| $f_B = 59.203$ | | |
| $r_1 = 37.6419$ | | |
| $d_1 = 9.1366$ | $n_1 = 1.77250$ | $\nu_1 = 49.66$ |
| $r_2 = 79.6905$ | | |
| $d_2 = 4.8083$ | | |
| $r_3 = -138.0254$ | | |
| $d_3 = 2.5426$ | $n_2 = 1.78472$ | $\nu_2 = 25.71$ |
| $r_4 = 62.9575$ | | |
| $d_4 = 7.2829$ | | |
| $r_5 = 71.0279$ | | |
| $d_5 = 9.9741$ | $n_3 = 1.80610$ | $\nu_3 = 40.95$ |
| $r_6 = -123.2100$ | | |
| $d_6 = 8.340$ | | |
| $r_7 = \infty$ (stop) | | |
| $d_7 = 19.7470$ | | |
| $r_8 = -22.7189$ | | |
| $d_8 = 2.5426$ | $n_4 = 1.50137$ | $\nu_4 = 56.40$ |

-continued $r_9 = -34.2129$ where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the focal length of the lens system as a whole, and reference symbol $f_B$ represents the back focal distance.

* * * * *